United States Patent [19]

Ida et al.

[11] Patent Number: 4,476,740
[45] Date of Patent: Oct. 16, 1984

[54] SHIFT MECHANISM FOR CHANGE-SPEED GEAR TRANSMISSION

[75] Inventors: Shuichiro Ida; Shoichi Ooshima; Ichiro Horiuchi, all of Toyota; Mitsufumi Nishu, Chiryu, all of Japan

[73] Assignees: Toyota Jidosha Kogyo Kabushiki Kaisha; Aisin Seiki Kabushiki Kaisha, both of Aichi, Japan

[21] Appl. No.: 359,870

[22] Filed: Mar. 19, 1982

[30] Foreign Application Priority Data

Mar. 30, 1981 [JP] Japan ................................ 56-44903

[51] Int. Cl.³ ............................................ F16H 57/06
[52] U.S. Cl. ...................................................... 74/476
[58] Field of Search .......................................... 74/476

[56] References Cited

U.S. PATENT DOCUMENTS

| | | | |
|---|---|---|---|
| 3,933,057 | 1/1976 | Tsuzuki et al. | 74/476 |
| 3,975,970 | 8/1976 | Elfes et al. | 74/473 R |
| 4,324,150 | 4/1982 | Kawamoto | 74/476 |

FOREIGN PATENT DOCUMENTS

| | | |
|---|---|---|
| 2645271 | 10/1976 | Fed. Rep. of Germany ........ 74/476 |
| 127172 | 3/1976 | Japan . |
| 2063 | 1/1977 | Japan . |
| 23060 | 8/1979 | Japan . |
| 152333 | 4/1980 | Japan . |
| 107159 | 8/1980 | Japan ..................... 74/476 |

Primary Examiner—Lawrence J. Staab
Assistant Examiner—Michael J. Gonet
Attorney, Agent, or Firm—Parkhurst & Oliff

[57] ABSTRACT

A shift mechanism for a change-speed gear transmission includes a manual gearshift lever arranged to be selectively shiftable toward forward speed-ratio and reverse-ratio positions at the same gate in a gearshift pattern, a movable member integral with a selector shaft mounted within a housing assembly of the gear transmission for both axial and rotary movement and being operatively connected to the gearshift lever to be axially moved in selecting operation of the gearshift lever toward the gate and to be rotated in shifting operation of the gearshift lever toward one of the forward speed-ratio and reverse-ratio positions. The movable member is provided with a radial lever arm arranged to be selectively movable for engagement of the forward and reverse gear ratios and provided with a radial projection which is arranged to be engaged with a recessed portion formed on one end of a spring-loaded restrict pin in shifting operation of the gearshift lever from the forward speed-ratio position toward the reverse-ratio position across the same gate to prevent an error in the shifting operation.

4 Claims, 10 Drawing Figures

SHIFT MECHANISM FOR CHANGE-SPEED GEAR TRANSMISSION

BACKGROUND OF THE INVENTION

The present invention relates to a shift mechanism for a change-speed gear transmission for use in automotive vehicles, and more particularly to a shift mechanism of the type which comprises a manual gearshift lever arranged to be selectively shiftable toward forward speed-ratio and reverse-ratio positions at the same gate in a gearshift pattern, a selector shaft mounted within a housing assembly of the gear transmission for both axial and rotary movement and being operatively connected to the gearshift lever to be axially moved in selecting operation of the gearshift lever toward the gate and to be rotated in shifting operation of the gearshift lever toward one of the forward speed-ratio and reverse-ratio positions, and a movable member mounted on the selector shaft for axial and rotary movement integral with the selector shaft and having a radial lever arm arranged to be selectively movable for establishing a forward speed-ratio gear train in shifting operation of the gearshift lever toward the forward speed-ratio position and for establishing a reverse-ratio gear train in shifting operation of the gearshift lever toward the reverse-ratio position.

In such a shift mechanism as described above, it is afraid that the gearshift lever is erroneously shifted from its forward speed-ratio position to its reverse-ratio position across the same gate in the gearshift pattern. It is, therefore, required to prevent such an error in shifting operation of the gearshift lever toward the reverse-ratio position.

SUMMARY OF THE INVENTION

The primary object of the present invention is to provide a safety device for such a shift mechanism as described above which is capable of reliably preventing an error in shifting operation of the gearshift lever toward its reverse-ratio position from its forward speed-ratio position in a simple construction by using conventional component parts and portions of the shift mechanism.

According to the present invention, there is provided a safety device for the shift mechanism which comprises a radial projection integral with the movable member, a reverse restrict pin rotatable and axially slidable within a boss portion integrally formed with the inner wall of the housing assembly in parallel with the selector shaft, the restrict pin being provided at one end thereof with a recessed portion arranged to be engaged with the radial projection of the movable member in shifting operation of the gearshift lever from the forward speed-ratio position to the reverse-ratio position across the same gate in the shift pattern to restrict the movement of the radial lever arm of the movable member, means for positioning the restrict pin in its assembled position in such a way to allow axial movement of the restrict pin in a predetermined distance, and resilient means for biasing the restrict pin toward the radial projection of the movable member.

It is preferable that the recessed portion of the restrict pin is a semi-circular recessed portion forming a radial abutment surface to be engaged with the side face of the radial projection of the movable member, and it is also preferable that means for positioning the restrict pin in its assembled position is a radial pin fixed within the boss portion of the housing assembly and extending across a radial groove formed at an intermediate portion of the restrict pin to allow the axial movement of the restrict pin in a predetermined distance defined by the width of the radial groove. It is further preferable that the resilient means is a coil spring in surrounding relationship with the restrict pin and fixed at its one end to the boss portion of the housing assembly and at its other end to the one end periphery of the restrict pin to bias the restrict pin toward the radial projection of the movable member.

BRIEF DESCRIPTION OF THE DRAWINGS

Additional objects and advantages of the present invention will be more readily apparent from the following detailed description of a preferred embodiment thereof when taken together with the accompanying drawings, in which.

DESCRIPTION OF THE PREFERRED EMBODIMENT

Figure 1:
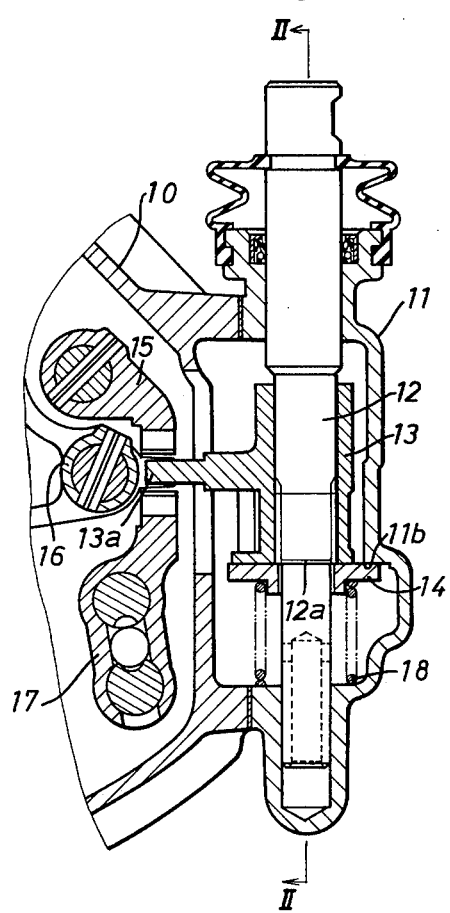
FIG. 1 is a fragmentary sectional view of a shift mechanism for a change-speed gear transmission.
Figure 2:
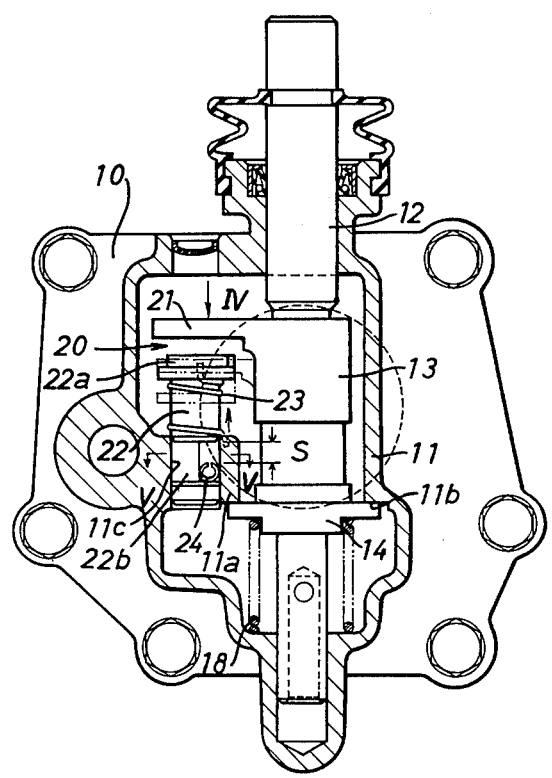
FIG. 2 is a sectional view taken along line II—II in FIG. 1, showing a safety device according to the present invention.
Figure 3:
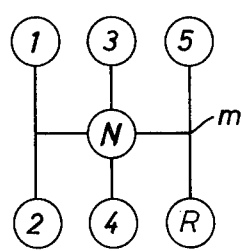
FIG. 3 illustrates the shift pattern of gearshift movement for engagement of the various gear ratios in the gear transmission.

In FIGS. 1 and 2 of the drawings, there is partially illustrated a shift mechanism of the remote control type for a change-speed gear transmission which is arranged to give five forward gear ratios and a single reverse gear ratio by means of a gearshift pattern shown in FIG. 3. The shift mechanism includes a shift-lever shaft or selector shaft 12 mounted within a cover housing 11 for both axial and rotary movement, and the cover housing 11 is integrally fitted to a transmission housing 10. The selector shaft 12 is under the control of a manual gearshift lever (not shown) which is arranged to be selectively movable for effecting the axial movement of selector shaft 12 in its selecting operation and for effecting the rotary movement of selector shaft 12 in its shifting operation. The selector shaft 12 is provided thereon with a selector sleeve member 13 which is united with the selector shaft 12 in operation.

The selector sleeve member 13 is received by a spring seat member 14 and has a radial lever arm 13a which extends into the interior of housing 10 to be brought into engagement with one of three-shift heads 15, 16, 17 in response to selective axial movement of the selector shaft 12. The shift-head 15 is arranged to selectively establish the first or second speed-ratio gear train in its shifted position, and the shift-head 16 is arranged to selectively establish the third or fourth speed-ratio gear train in its shifted position. The shift-head 17 is further arranged to selectively establish the fifth speed-ratio gear train or the reverse-ratio gear train. The spring seat member 14 is slidably mounted on the selector shaft 12 and is loaded upwardly by a coil spring 18 which is received at its lower end by the bottom wall of cover housing 11. Thus, the spring seat member 14 is resiliently in engagement with a stepped portion 12a of shaft 12 and in engagement with a stepped portion 11b of the inner wall of cover housing 11 and the bottom end of a boss portion 11a in cover housing 11 so that the selector sleeve member 13 is held in its neutral position, as shown in FIGS. 1 and 2.

Figure 4:
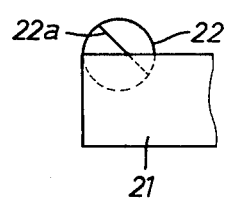
FIG. 4 is fragmentary plan view indicated by an arrow IV in FIG. 2, showing a radial projection of a selector sleeve member in relation to the upper end of a reverse restrict pin.

In the embodiment of the shift mechanism according to the present invention, as shown in FIG. 2, there is provided with a safety device 20 for preventing direct movement of the gearshift lever into the reverse-ratio position R from the fifth speed-ratio position 5 across the same gate m in the gearshift pattern. The safety device 20 includes a radial projection 21 integral with the selector sleeve member 13, a reverse restrict pin 22 mounted in the boss portion 11a, a coil spring 23 assembled with the restrict pin 22, and a radial slotted pin 24 fixed in the boss portion 11a for positioning the reverse restrict pin 22 in its assembled position. When the gearshift lever is in its neutral position N of FIG. 3, the radial projection 21 of selector sleeve member 13 is positioned in relation to the reverse restrict pin 22 as shown in FIGS. 2 and 4. The reverse restrict pin 22 is rotatable and axially slidable within a mounting bore 11c in the boss portion 11a of cover housing 11 and opposes at its upper end to the radial projection 21 of sleeve member 13.

Figure 5:
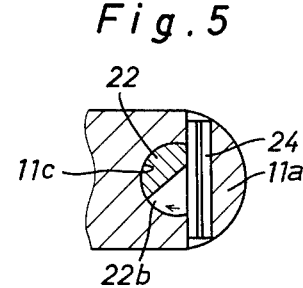
FIG. 5 illustrates a fragmentary cross-section taken along line V—V in FIG. 2.

As can be well seen in FIGS. 2 and 4, the restrict pin 22 is also provided at its upper end with a semi-circular recessed portion 22a forming a radial abutment surface and at its intermediate portion with a radial groove 22b of a predetermined width forming a radial abutment surface as shown in FIG. 5. The semi-circular recessed poriton 22a is arranged to receive therein the radial projection 21 of sleeve member 13 so as to restrict the rotary movement of sleeve member 13 by engagement with the radial projection 21, as described in detail later. The coil spring 23 is in surrounding relationship with the restrict pin 22 and is fixed at its one end to the upper shoulder of boss portion 11a of cover housing 11 and at its other end to the upper end periphery of restrict pin 22 to bias the restrict pin 22 upwardly and clockwisely as shown by respective arrows in FIG. 2 and in FIG. 5. The slotted pin 24 extends across the radial groove 22b to restrict the clockwise rotary movement of the restrict pin 22 by engagement with the same and to allow the axial displacement of restrict pin 22 in a predetermined distance S shown in FIG. 2. The distance S is defined by the width of radial groove 22b to be slightly larger than a distance for downward axial displacement of the restrict pin 22 caused by engagement with the radial projection 21 of sleeve member 13 when the gearshift lever is moved from its neutral position N to the gate position m in the shift pattern of FIG. 3.

In operation of the gearshift lever for selecting one of the first to fourth forward speed-ratio positions 1, 2, 3 and 4 in the shift pattern of FIG. 3, the radial projection 21 of sleeve member 13 does not abut against the reverse restrict pin 22 to freely allow the selecting and shifting operation of the gearshift lever. When the gearshift lever is moved from its neutral position N to the gate position m in the shift pattern of FIG. 3 to produce downward movement of the selector shaft 12 and sleeve member 13 against the load of spring 18, the radial projection 21 of sleeve member 13 is brought into engagement with the upper end of restrict pin 22 to push down the pin 22 against the load of spring 23 as shown by imaginary lines in FIG. 2. Under such a condition as described above, when the gearshift lever is shifted to the fifth speed-ratio position 5 in the shift pattern to establish the fifth speed-ratio gear train, the radial projection 21 of sleeve member 13 disengages from the upper end of restrict pin 22 due to counterclockwise rotary movement of selector shaft 12, and the spring 23 acts to return the restrict pin 22 toward its assembled position.

Figure 6:
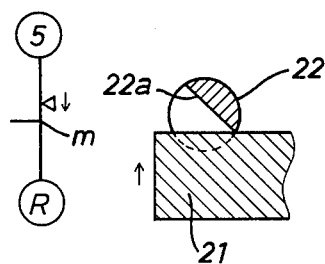
FIGS. 6 through 10 illustrate relative positions between the radial projection of the selector sleeve member and the upper end of the restrict pin in each shifted position of the gearshift lever.
Figure 7:
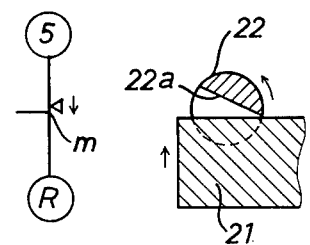
Figure 8:
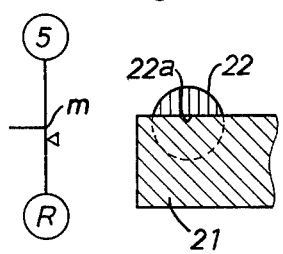

If the gearshift lever is moved from the shifted fifth speed-ratio position 5 to the reverse-ratio position R after the above operation, the radial projection 21 of sleeve member 13 will be aligned with the semi-circular recessed portion 22a of restrict pin 22 and will abut against a shoulder of pin 22 prior to displacement of the gearshift lever to the gate position m in the shift pattern, as shown in FIG. 6. This causes counterclockwise rotary movement of the restrict pin 22 against the load of spring 23 as shown in FIG. 7. When the gearshift lever is displaced slightly over the gate position m in the shift pattern, as shown in FIG. 8, the rotary movement of the restrict pin 22 is restricted by full engagement of the radial projection 21 with the radial abutment surface of pin 22 at its recessed portion 22a to prevent an error in shifting operation of the gearshift lever toward the reverse-ratio position R.

Figure 9:
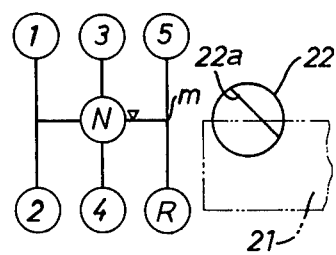
Figure 10:
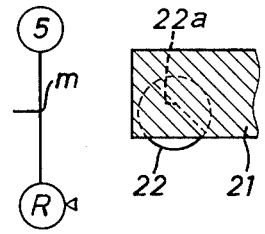

To establish the reverse-ratio gear train, the gearshift lever is moved from the gate position m to the neutral position N and thereafter moved from the neutral position N to the reverse-ratio position R through the gate position m in the shift pattern. During movement of the gearshift lever from the gate position m to the neutral position N, the radial projection 21 of sleeve member 13 disengages from the recessed portion 22a of restrict pin 22 due to upward axial movement of the selector shaft 12, and the coil spring 23 acts to return the restrict pin 22 to its assembled position, as shown in FIG. 9. During movement of the gearshift lever from the neutral position N to the gate position m in the shift pattern, the radial projection 21 of sleeve member 13 abuts against the upper end of restrict pin 22 to push down the pin 22 against the load of spring 23, and subsequently the abutment of the radial projection 21 with the upper end of pin 22 is maintained during movement of the gearshift lever toward the reverse-ratio position R in the shift pattern to allow clockwise rotary movement of the sleeve member 13, as shown in FIG. 10, so as to establish the reverse-ratio gear train.

As is understood from the above description, the presently preferred embodiment is characterized in that the safety device 20 is simply constructed in a limited space by provision of such a relatively small number of component parts and portions as the radial projection 21 integral with the selector sleeve member 13, the reverse restrict pin 22 rotatable and axially slidable within the boss portion 11a of cover housing 11 and provided at the upper end thereof with the recessed portion 22a engageable with the radial projection 21 of sleeve member 13 in shifting operation of the gearshift lever from the fifth speed-ratio position to the reverse-ratio position, the coil spring 23 for biasing the restrict pin toward its assembled original position, and the radial slotted pin 24 fixed in the boss portion 11a across the intermediate portion of the restrict pin 22 in such a way to allow the predetermined axial movement of the restrict pin 22.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In combination with a shift mechanism for a change-speed gear transmission including a manual gearshift lever arranged to be selectively shiftable toward forward speed-ratio and reverse-ratio positions at the same gate in a gearshift pattern; a selector shaft mounted within a housing assembly of said gear transmission for both axial and rotary movement and being operatively connected to said gearshift lever to be axially moved in a selecting operation of said gearshift lever toward said gate and to be rotated in a shifting operation of said gearshift lever toward one of said forward speed-ratio and reverse-ratio positions; and a movable member mounted on said selector shaft for axial and rotary movement with said selector shaft and having a radial lever arm arranged to be selectively movable for establishing a forward speed-ratio gear train in the shifting operation of said gearshift lever toward said forward speed-ratio position and for establishing a reverse-ratio gear train in the shifting operation of said gearshift lever toward said reverse-ratio position;

a safety device for said shift mechanism comprising: a radial projection integral with said movable member; a reverse restrict pin rotatable and axially slidable within a boss portion integrally formed with the inner wall of said housing assembly in parallel with said selector shaft, said restrict pin being provided at one end thereof with a recessed portion arranged to be engaged with said radial projection of said movable member in the shifting operation of said gearshift lever from said forward speed-ratio position to said reverse-ratio position across said same gate to restrict the rotary movement of said radial lever arm of said movable member; means for positioning said restrict pin in its assembled position in such a way to allow axial movement of said restrict pin in a predetermined distance; and resilient means for biasing said restrict pin toward said radial projection of said movable member and toward its assembled position.

2. A shift mechanism as claimed in claim 1, wherein said recessed portion of said restrict pin is a semi-circular recessed portion forming a radial abutment surface to be engaged with the side face of said radial projection of said movable member.

3. A shift mechanism as claimed in claim 1 or 2, wherein said means for positioning said restrict pin in its assembled position is a radial pin fixed within said boss portion of said housing assembly and extending across a radial groove formed at an intermediate portion of said restrict pin to allow the axial movement of said restrict pin in a predetermined distance defined by the width of said radial groove.

4. A shift mechanism as claimed in claim 1 or 2, wherein said resilient means is a coil spring in surrounding relationship with said restrict pin and fixed at its one end to said boss portion of said housing assembly and at its other end to the one end periphery of said restrict pin to bias said restrict pin toward said radial projection of said movable member.

* * * * *